(12) United States Patent
Huang

(10) Patent No.: US 7,009,505 B2
(45) Date of Patent: *Mar. 7, 2006

(54) TIRE PRESSURE GAUGE

(76) Inventor: Tien-Tsai Huang, No. 4, Lane 30, Wu-Chuan St., Pan-Chiao City, Taipei Hsien (TW)

( * ) Notice: Subject to any disclaimer, the term of this patent is extended or adjusted under 35 U.S.C. 154(b) by 197 days.

This patent is subject to a terminal disclaimer.

(21) Appl. No.: 10/685,731

(22) Filed: Oct. 14, 2003

(65) Prior Publication Data

US 2005/0005693 A1    Jan. 13, 2005

(30) Foreign Application Priority Data

Jul. 10, 2003    (TW) ............................... 92118875 A (51) Int. Cl.
*B60C 23/02* (2006.01)
(52) U.S. Cl. ...................... 340/442; 340/444; 340/445; 340/447; 340/626; 116/34 R
(58) Field of Classification Search ................ 340/442, 340/444, 445, 447, 448, 450, 626; 116/34 R, 116/266, 270; 73/146.4, 146.5, 146.8, 744; 137/233; 200/61.22
See application file for complete search history.

(56) References Cited

U.S. PATENT DOCUMENTS

| | | | |
|---|---|---|---|
| 2,225,675 A | | 12/1940 | West |
| 4,136,560 A | * | 1/1979 | Gellos ........................ 73/146.8 |
| 4,362,121 A | * | 12/1982 | Pegram ..................... 116/34 R |
| 5,886,254 A | | 3/1999 | Chi |
| 5,939,627 A | | 8/1999 | Huang |
| 6,525,655 B1 | | 2/2003 | Huang |

* cited by examiner

*Primary Examiner*—Hung Nguyen
(74) *Attorney, Agent, or Firm*—Zagorin O'Brien Graham LLP (57) ABSTRACT

A tire pressure gauge includes a tubular housing, an air ventilating member dividing the housing into receiving and coupling chambers, a flexible diaphragm disposed in the receiving chamber and having a raised portion which is movable in response to an air pressure introduced into the receiving chamber through the coupling chamber, which is coupled to a tire valve, so as to move a pressure indicating member relative to a cap in order to indicate the tire pressure condition, an adjustable member adjustably disposed in the cap, and a biasing member disposed between the pressure indicating member and the adjustable member so as to correct the position of the pressure indicating member.

9 Claims, 8 Drawing Sheets

TIRE PRESSURE GAUGE

CROSS-REFERENCE TO RELATED APPLICATION

This application claims priority of Taiwanese Application No. 092118875, filed on Jul. 10, 2003.

BACKGROUND OF THE INVENTION

1. Field of the Invention

This invention relates to a tire pressure gauge, more particularly to a tire pressure gauge having a replaceable biasing member so as to be suitable for use in measuring of tire pressures of different tires.

2. Description of the Related Art

A conventional tire pressure gauge, such as those disclosed in U.S. Pat. Nos. 2,225,675, 5,886,254 and 6,525,655 B2, uses a flexible diaphragm to raise a piston in response to air pressure introduced into a casing from a detected tire such that the movement of the piston relative to an indicating member secured in the casing, can indicate the tire pressure of the tire. Since quality deviation often occurs in the manufacturing processes, means for correcting the initial position of the piston is needed for maintaining the precision of the tire pressure gauge.

U.S. Pat. No. 5,939,627 granted to the present inventor discloses a tire pressure gauge with an adjustable extension member to adjust the length of an outwardly extending portion of a plunger or to correct the position of the graduations provided on the plunger relative to a pointing end of a tubular housing where a detected pressure is read. However, the adjustable extension member, which is not fastened to the plunger, may rotate with a slender pen element during adjustment of the adjustable extension member, thereby resulting in inconvenience. Moreover, to measure different tire pressures, a spring for biasing the piston towards a pressure inlet hole has to be replaced so as to change the biasing force. However, replacement of the spring is not convenient in this tire pressure gauge.

SUMMARY OF THE INVENTION

The object of the present invention is to provide a tire pressure gauge which permits convenient replacement of a spring therein, and which has correction means to maintain the precision thereof.

According to this invention, the tire pressure gauge includes a tubular housing which has a surrounding wall surrounding a central axis and defining an accommodation space, and an inner wall extending from the surrounding wall in radial directions and toward the central axis. The inner wall terminates at an inner peripheral edge to define an opening, and divides the accommodation space into a receiving chamber and a coupling chamber that is adapted to couple with a tire nozzle of a tire. A cap is secured to the surrounding wall to cover and close the receiving chamber, and has a mounting hole extending therethrough along the central axis. An air ventilating member is secured to the inner wall and seals the opening. The air ventilating member includes a projection which extends along the central axis to be adapted to extend into the tire nozzle so as to permit air in the tire to enter the coupling chamber, and a vent hole which permits the air in the coupling chamber to enter the receiving chamber therethrough. A flexible diaphragm is disposed in the receiving chamber to air-tightly divide the receiving chamber into compressible and expandable regions, which are proximate to the cap and the air ventilating member, respectively. The expandable region is communicated with the opening through the vent hole. The flexible diaphragm has a raised portion which is configured to be movable along the central axis towards the cap in response to an air pressure introduced into the expandable region through the vent hole. A pressure indicating member has a lower portion which includes a lower surface that abuts against the raised portion of the flexible diaphragm so as to be moved with the raised portion along the central axis, and an upper surface opposite to the lower surface along the central axis and confronting the cap. An adjustable member is mounted in the mounting hole, and is movable adjustably relative to the cap along the central axis. A biasing member is disposed between the upper surface of the lower portion of the pressure indicating member and the adjustable member so as to bias the pressure indicating member towards the air ventilating member against movement of the raised portion.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 1:
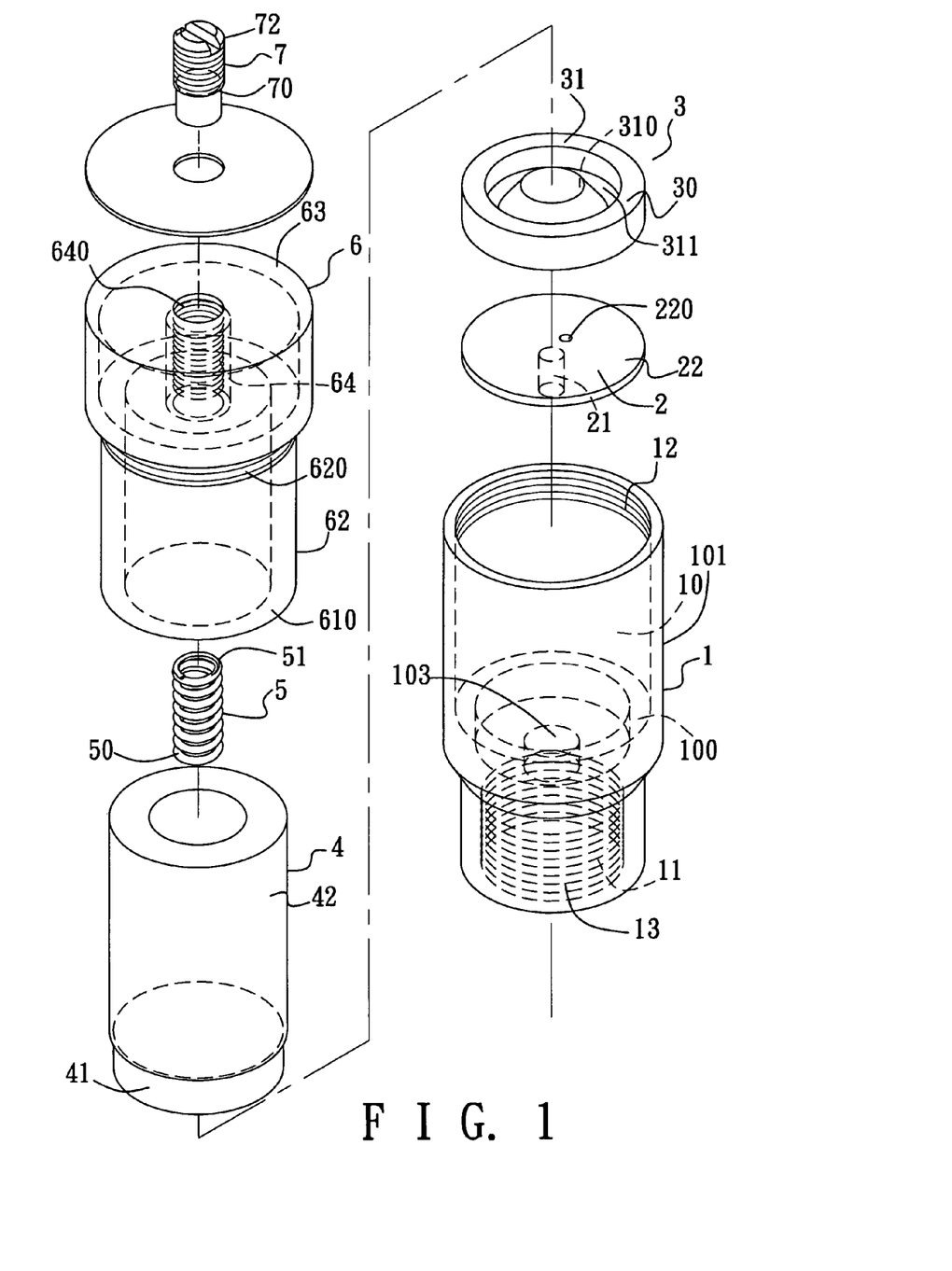
FIG. 1 is an exploded perspective view of the first preferred embodiment of a tire pressure gauge according to this invention.
Figure 2:
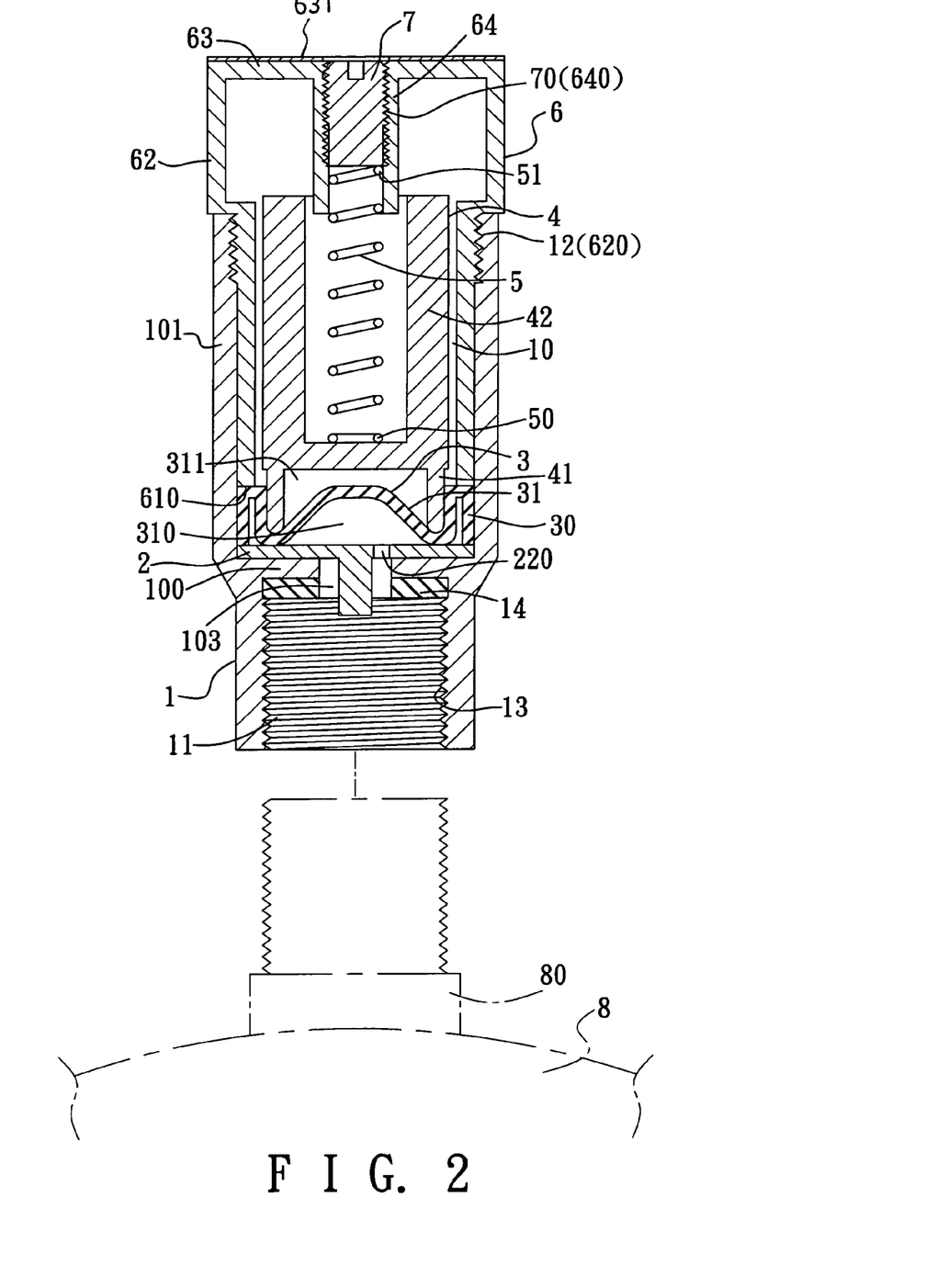
FIG. 2 is a sectional view of the first preferred embodiment.

Referring to FIGS. 1 and 2, the first preferred embodiment of a tire pressure gauge according to the present invention is shown to comprise a tubular housing 1, a cap 6, an air ventilation member 2, a flexible diaphragm 3, a pressure indicating member 4, an adjustable member 7, and a biasing member 5.

Figure 3:
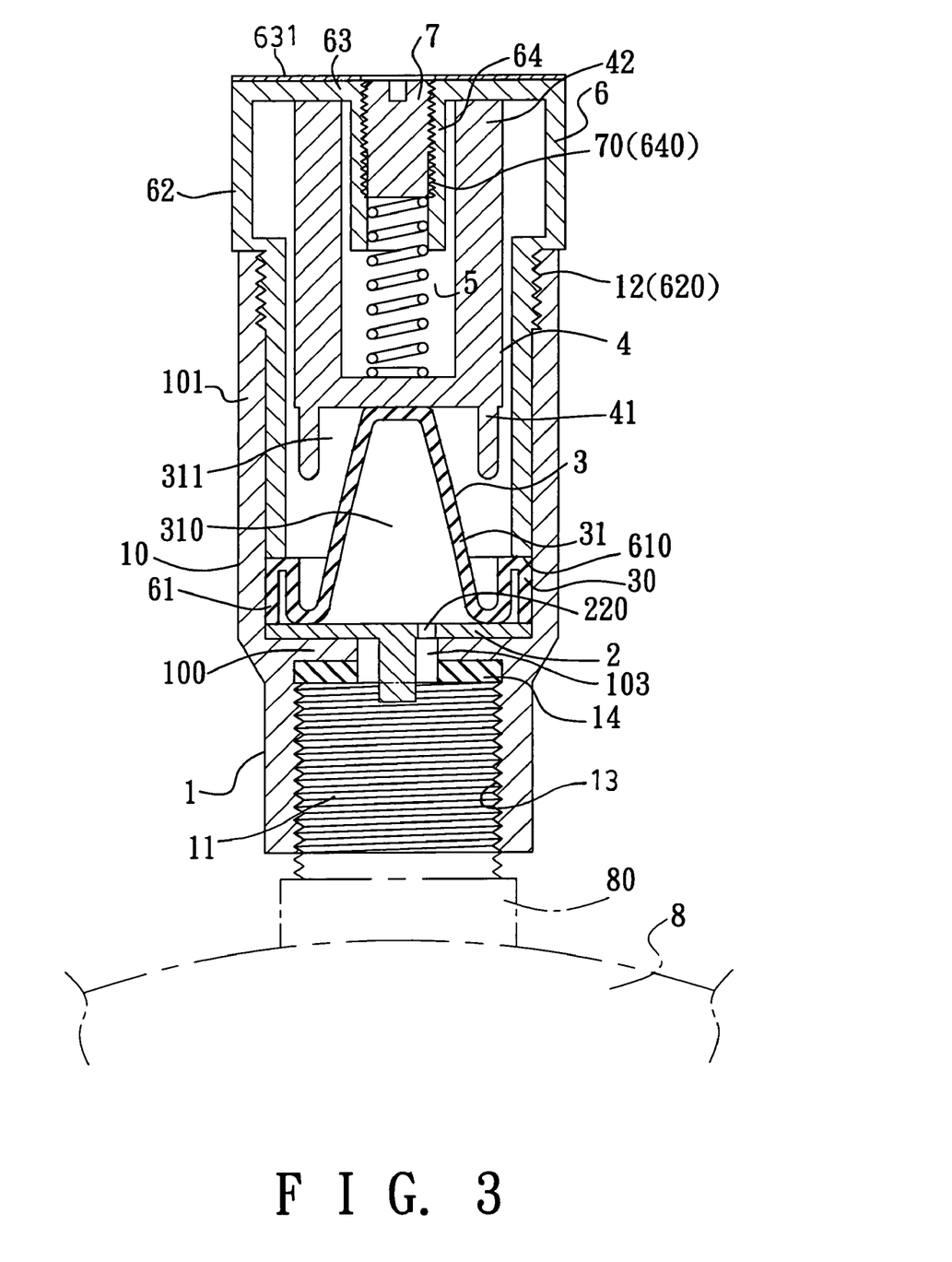
FIG. 3 is a sectional view of the first preferred embodiment after it is coupled to an air nozzle of a tire.

The tubular housing 1 includes a surrounding wall 101 which surrounds a central axis and which defines an accommodation space, and an inner wall 100 which extends from the surrounding wall 101 in radial directions and toward the central axis, which terminates at an inner peripheral edge that defines an opening 103, and which divides the accommodation space into receiving and coupling chambers 10, 11. The surrounding wall 101 has first and second internally threaded portions 12,13 in the receiving and coupling chambers 10,11, respectively. A surrounding seal pad 14 is received in the coupling chamber 11 such that a tire nozzle 80 of a tire 8 can be coupled to the second internally threaded portion 13 in an air-tight manner, as shown in FIG. 3.

The cap 6 is made of a transparent material, and includes a top wall 63 which has an outer periphery and an inner peripheral edge which surrounds the central axis, a barrel wall 62 which extends from the periphery of the top wall 63 and which has an externally threaded portion 620 that engages threadedly the first internally threaded portion 12 so as to cover and close the receiving chamber 10, and a tubular wall 64 which extends from the inner peripheral edge along the central axis to define a mounting hole and which is provided with an internally threaded portion 640.

The air ventilating member 2 has a T-shaped cross-section, and includes a disk 22 which is retained on the inner wall 100 to seal the opening 103, and a projection 21 which extends from the disk 22 along the central axis and into the coupling chamber 11 to be adapted to extend into the tire nozzle 80 so as to permit air in the tire 8 to enter the coupling chamber 11 in a known manner. The disk 22 is formed with at least one vent hole 220, which permits the air in the coupling chamber 11 to enter the receiving chamber 10 therethrough.

The barrel wall 62 of the cap 6 has a lower surrounding edge 610 which cooperates with the air ventilating member 2 to define an annular retaining groove 61.

The flexible diaphragm 3 is made of an elastomeric material, and includes a surrounding base portion 30 which is retained in the annular retaining groove 61, and a raised portion 31 which is surrounded by the surrounding base portion 30. The flexible diaphragm 3 is disposed in the receiving chamber 10 to divide air-tightly the receiving chamber 10 into compressible and expandable regions 311, 310, which are respectively proximate to the cap 6 and the air ventilating member 2. The expandable region 310 is communicated with the opening 103 through the vent hole 220. The raised portion 31 is configured to be movable along the central axis toward the top wall 63 of the cap 6 in response to an air pressure introduced into the expandable region 310 through the vent hole 220, as shown in FIG. 3.

Preferably, a pressure indicating label 631 is attached to the top wall 63 of the cap 6 so as to show the range of tire pressure being adopted.

The pressure indicating member 4 has a lower portion 41 and a sleeve wall 42. The lower portion 41 includes a lower surface which abuts against the raised portion 31 of the flexible diaphragm 3 so as to be moved with the raised portion 31 along the central axis, and an upper surface which is opposite to the lower surface along the central axis and which confronts the top wall 63 of the cap 6. The sleeve wall 42 extends from the upper surface of the lower portion 41 towards the top wall 63 of the cap 6, and is brought to surround the tubular wall 64 of the flexible diaphragm 6 when the lower surface of the lower portion 41 is moved with the raised portion 31 upon coupling of the second internally threaded portion 13 to the tire valve 80 of the tire 8, as shown in FIG. 3. The extent of the tubular wall 64 that is surrounded and concealed by the sleeve wall 42 as viewed through the transparent barrel wall 62 of the cap 6, which serves as a see-through area, indicates the inflated condition of the tire 8. In this embodiment, the sleeve wall 42 has a green color to facilitate judgement.

The adjustable member 7 is formed as a screw bolt that is mounted in the mounting hole defined by the tubular wall 64, and has an externally threaded portion that engages threadedly the internally threaded portion 640 so as to be movable adjustably relative to the cap 6 along the central axis, and a slotted head 72 that is rotatable using a hand tool.

The biasing member 5 is a compression spring in this embodiment, and has two ends 51,50 which are disposed between the upper surface of the lower portion 41 of the pressure indicating member 4 and the adjustable member 7 to bias the pressure indicating member 4 towards the air ventilating member 2 against the movement of the raised portion 31.

In use, when the sleeve wall 42 of the pressure indicating member 4 is moved with the raised portion 31 and reaches the top wall 63 of the cap 6, referring to FIG. 3, the user can observe that the green sleeve wall 42 completely surrounds the tubular wall 64, which is indicative of a normal tire pressure, i.e. the tire 8 is fully inflated. If only a portion of the green sleeve wall 42 is visible, i.e. the sleeve wall 42 partially surrounds the tubular wall 64, it indicates that the tire pressure is insufficient and tire inflation is required to ensure driving safety.

Figure 4:
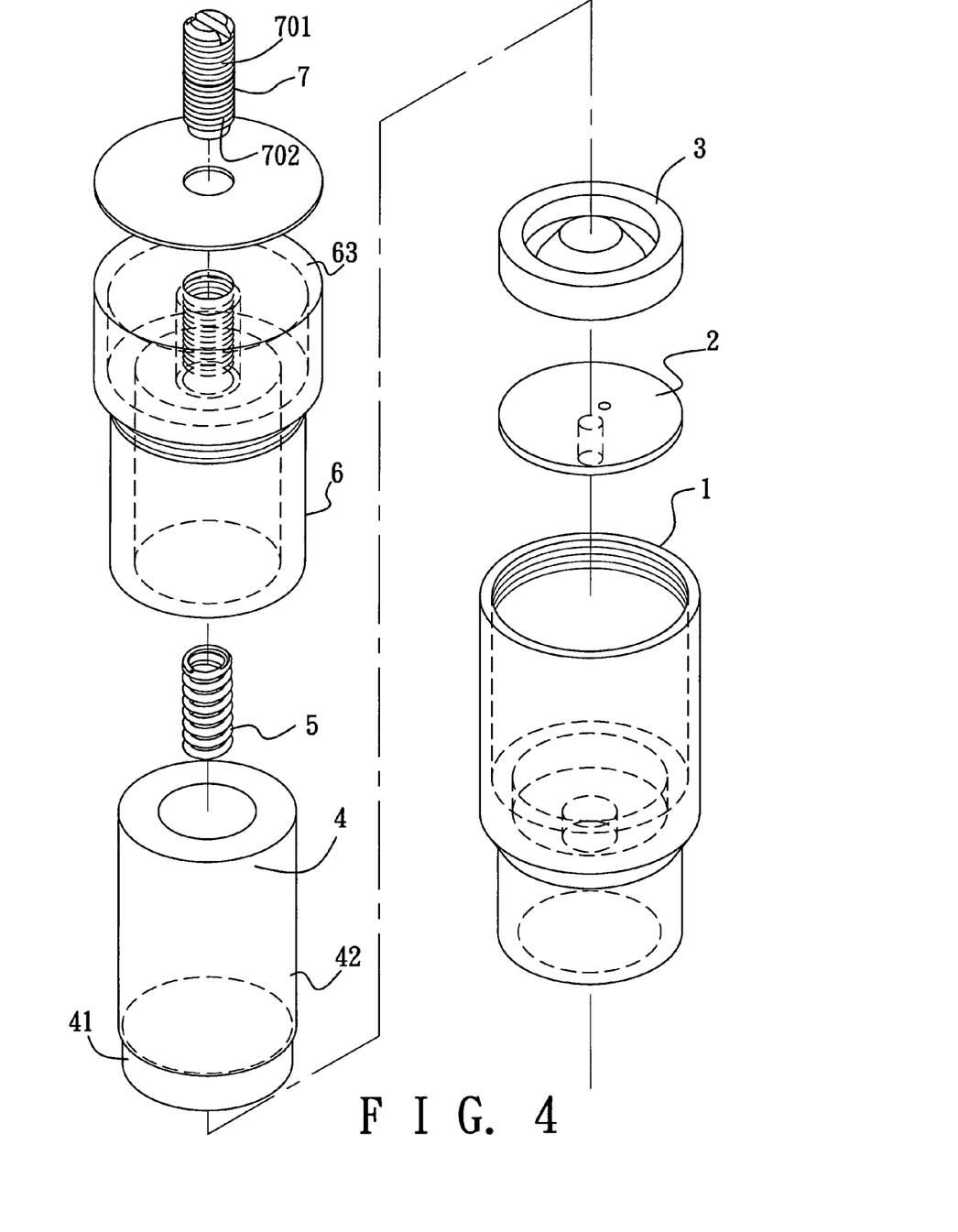
FIG. 4 is an exploded perspective view of the second preferred embodiment of the tire pressure gauge according to this invention.

Referring to FIG. 4, the second preferred embodiment of a tire pressure gauge according to this invention is shown to be similar to the first embodiment, except that the adjustable member 7 has first and second portions 701,702 which are opposite to each other along the central axis and which are respectively proximate to the top wall 63 of the cap 6 and the lower portion 41 of the pressure indicating member 4. The first and second portions 701,702 respectively have yellow and red colors. As such, when the detected tire pressure is normal, the sleeve wall 42 of the pressure indicating member 4 will surround the first and second portions 701,702 completely. If the detected tire pressure is insufficient, the yellow first portion 701 and even the red second portion 702 will be visible through the barrel wall 62 of the cap 6, thereby warning the user of a decreased tire pressure.

Figure 5:
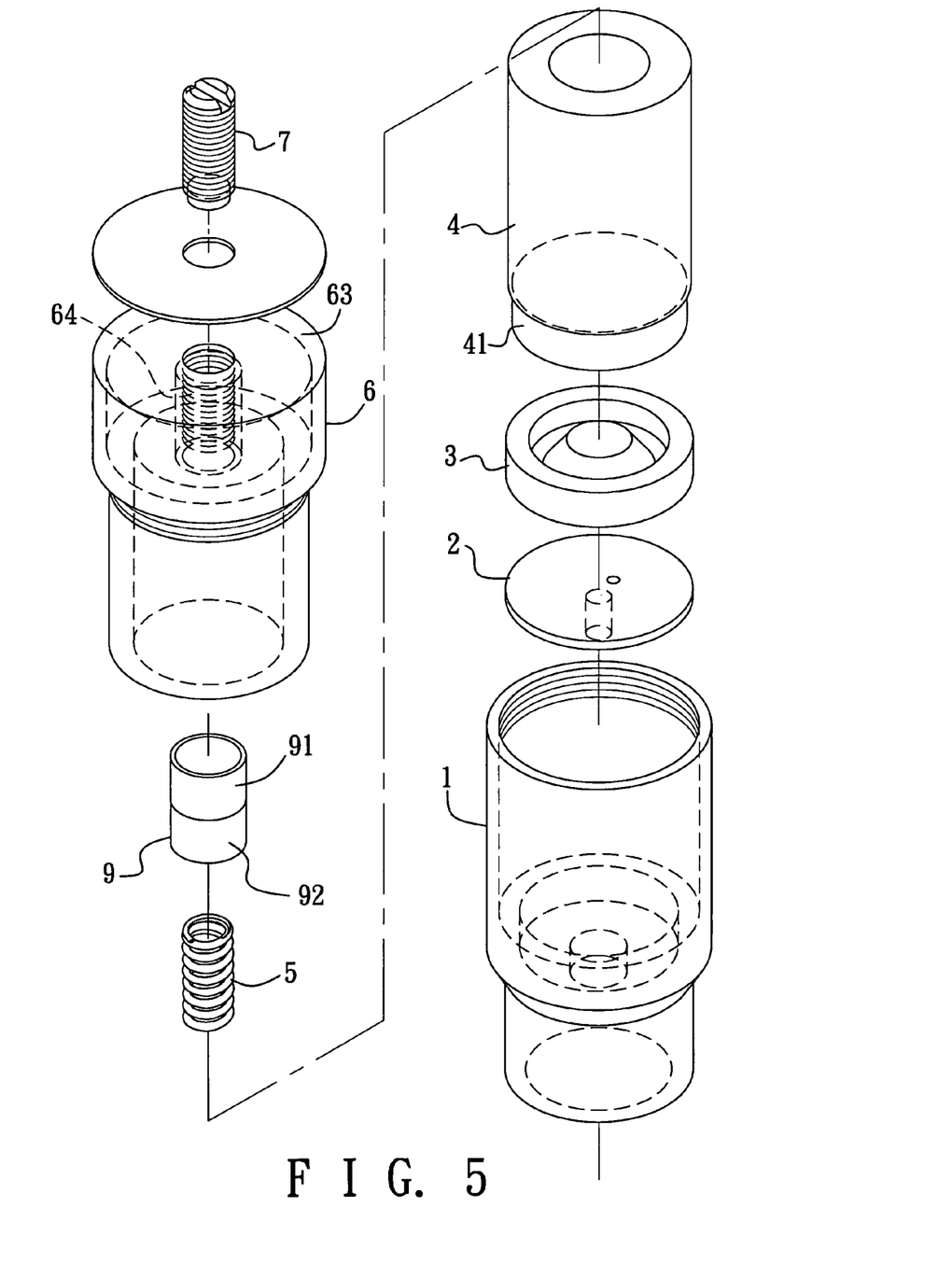
FIG. 5 is an exploded perspective view of the third preferred embodiment of the tire pressure gauge according to this invention.

Referring to FIG. 5, in the third preferred embodiment of this invention, an indicating sleeve 9 is further disposed to be sleeved on the tubular wall 64 of the cap 6, and has first and second portions 91,92 which are opposite to each other along the central axis and which are respectively proximate to the top wall 63 of the cap 6 and the lower portion 41 of the pressure indicating member 4. The first and second portions 91,92 respectively display yellow and red colors. The effect and function of this embodiment are substantially the same as those in the second embodiment.

When it is desired to measure a higher tire pressure, the adjustable member 7 is removed from the mounting hole in the tubular wall 64 to permit replacement of the biasing member 5 with one having greater biasing force. This can be conducted in a convenient manner.

Figure 6:
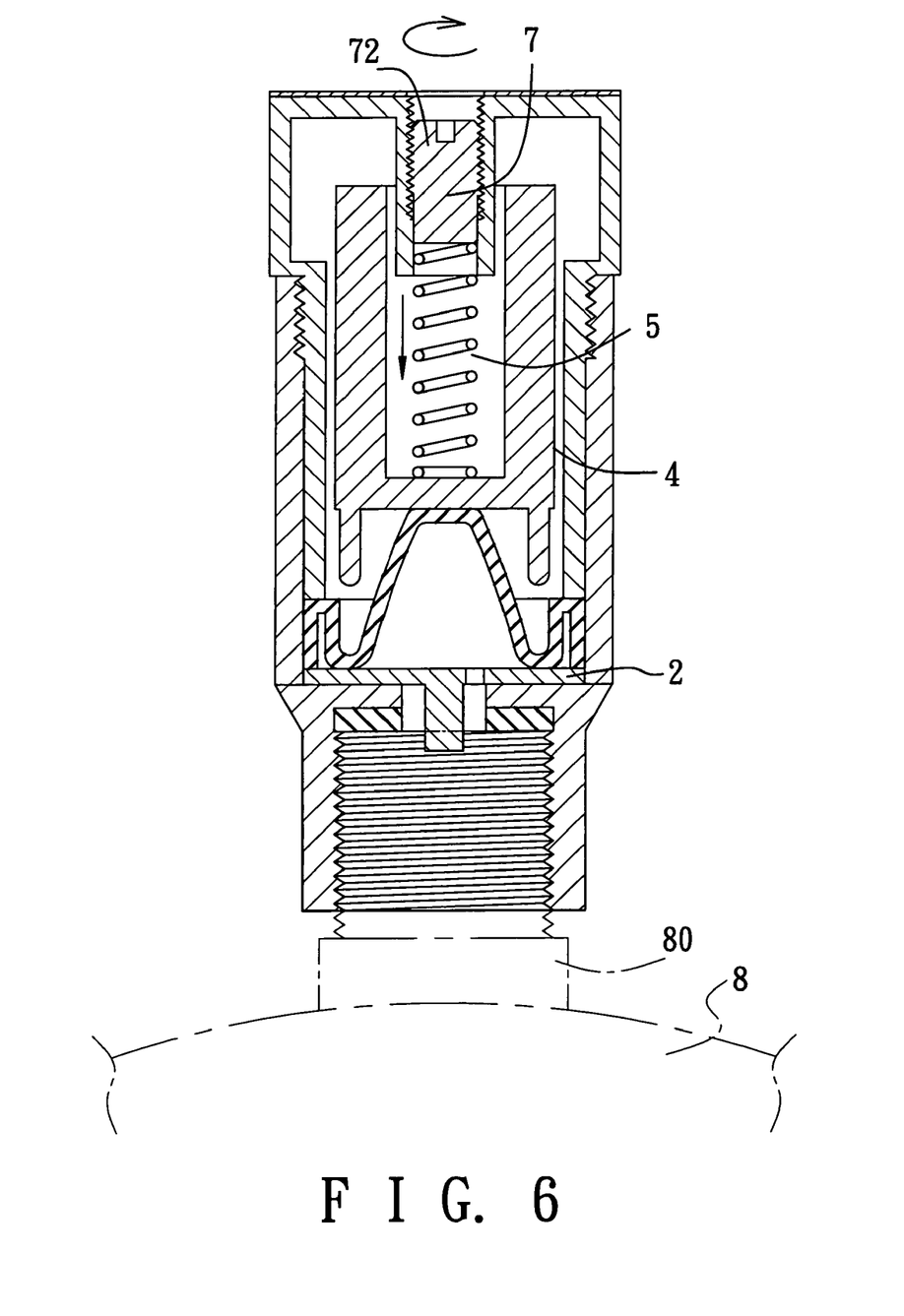
FIG. 6 is a sectional view of the first preferred embodiment after adjustment.

Referring to FIG. 6, for adjustment, the adjustable member 7 is turned to move towards the air ventilating member 2 along the central axis against the biasing action of the biasing member 5. The construction as described is convenient for correcting the position of the pressure indicating member 4 because the pressure indicating member 4 and the related components need not be disassembled.

Figure 7:
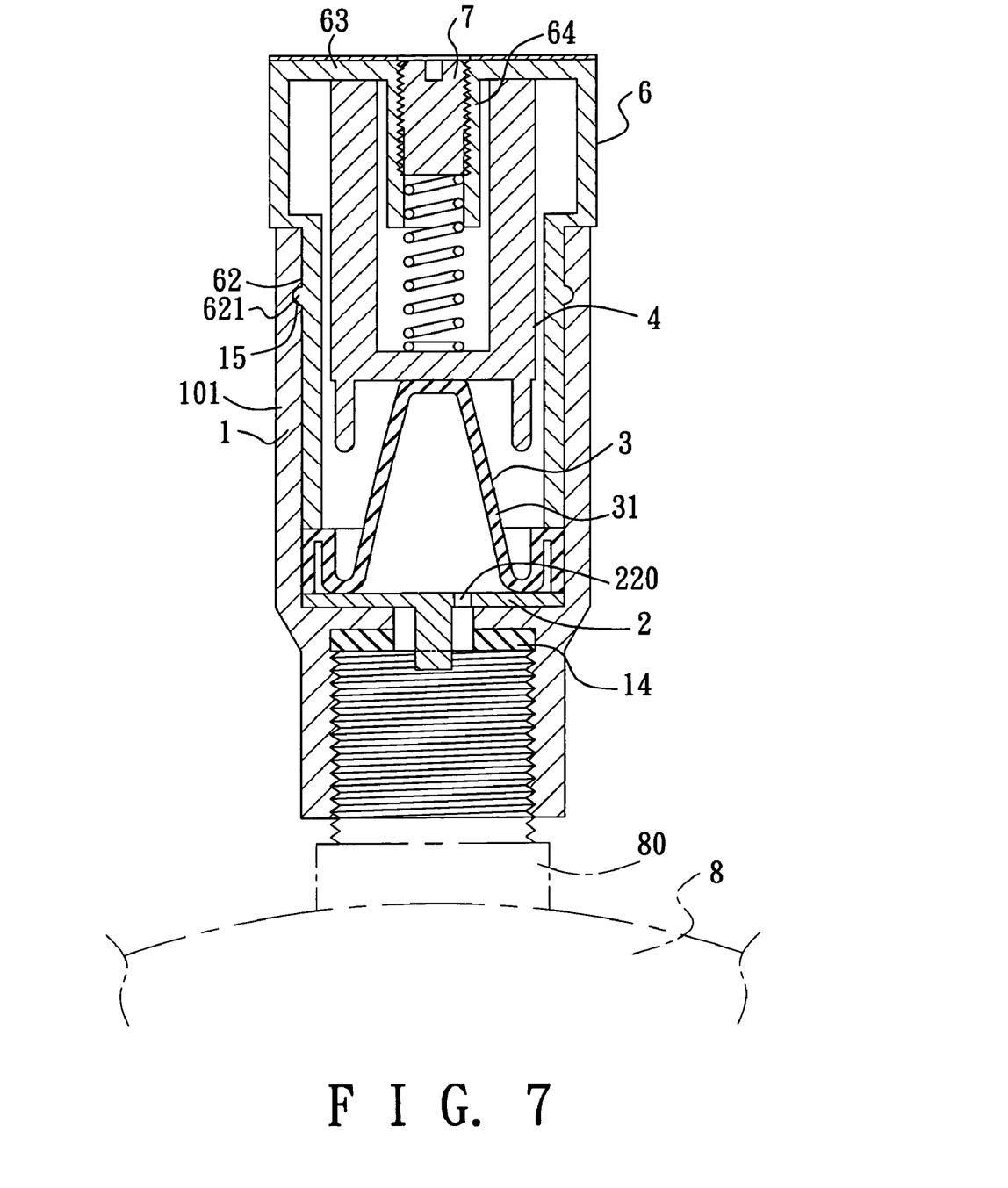
FIG. 7 is a sectional view of the fourth preferred embodiment of the tire pressure gauge according to this invention.

Referring to FIG. 7, in the fourth preferred embodiment of this invention, in place of the externally and internally threaded portions 12, 620 described in the first embodiment, four retaining protrusions 621 and an annular retaining groove 15 are formed on the surrounding wall 101 of the tubular housing 1 and the barrel wall 62 of the cap 6, respectively, for purposes of interengagement.

Figure 8:
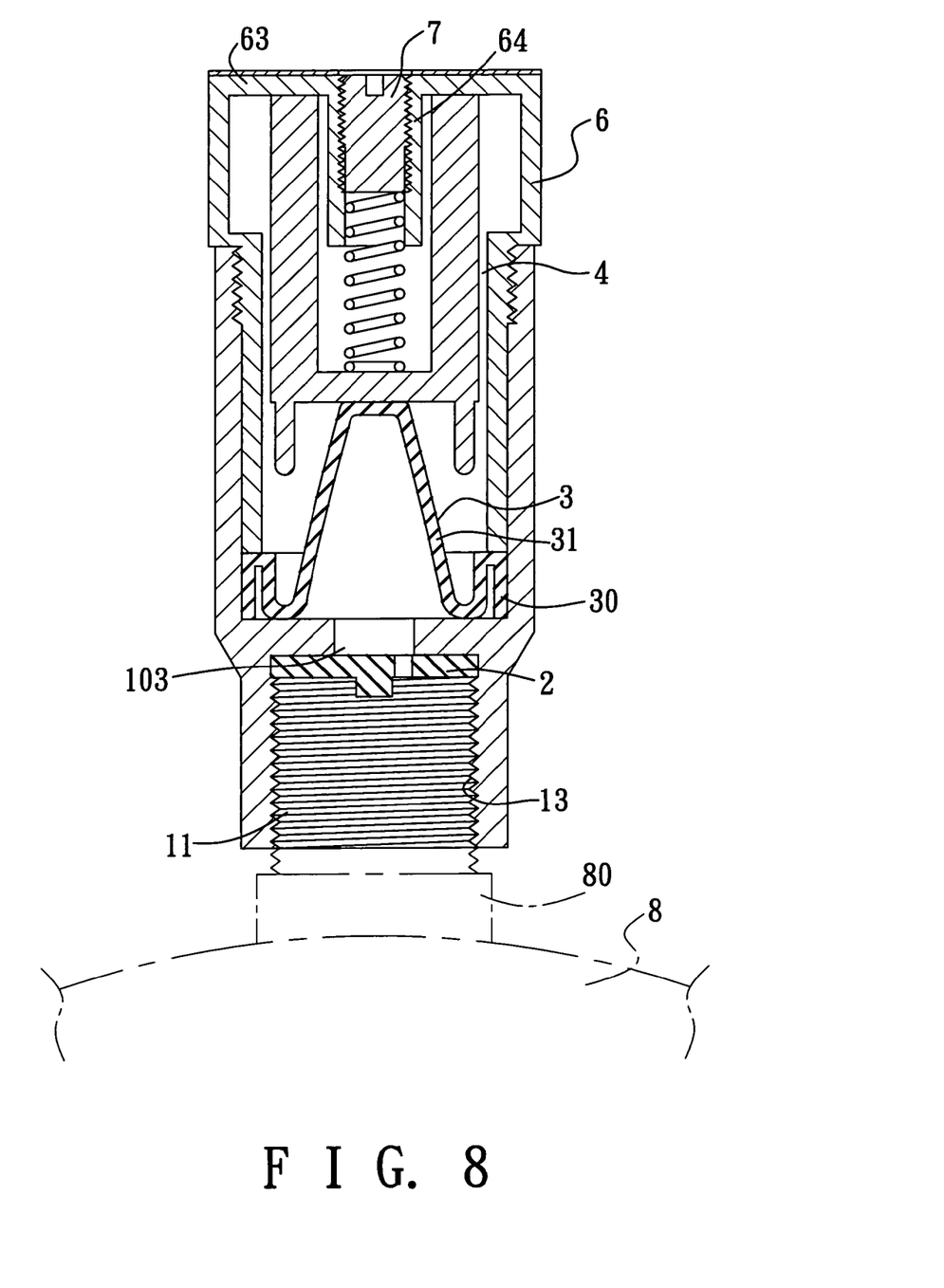
FIG. 8 is a sectional view of the fifth preferred embodiment of the tire pressure gauge according to this invention.

Referring to FIG. 8, the fifth preferred embodiment of this invention is shown to be similar to the first preferred embodiment, except that the air ventilating member 2 is made of rubber material, and is-disposed in the coupling chamber 11 to seal the opening 103. Thus, the surrounding seal pad 14 described in the first embodiment can be omitted.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A tire pressure gauge comprising:
    a tubular housing including a surrounding wall which surrounds a central axis and which defines an accommodation space, and an inner wall which extends from said surrounding wall in radial directions and toward the central axis, which terminates at an inner peripheral edge that defines an opening, and which divides said accommodation space into a receiving chamber and a coupling chamber that is adapted to couple with a tire nozzle of a tire;
    a cap secured to said surrounding wall to cover and close said receiving chamber, and having a mounting hole extending therethrough along the central axis;
    an air ventilating member secured to said inner wall and sealing said opening, said air ventilating member including a projection which extends along the central axis to be adapted to extend into the tire nozzle so as to permit air in the tire to enter said coupling chamber, and a vent hole which permits the air in said coupling chamber to enter said receiving chamber therethrough;
    a flexible diaphragm disposed in said receiving chamber to divide air-tightly said receiving chamber into compressible and expandable regions, which are proximate to said cap and said air ventilating member, respectively, said expandable region being communicated with said opening through said vent hole, said flexible diaphragm having a raised portion which is configured to be movable along the central axis towards said cap in response to an air pressure introduced into said expandable region through said vent hole;
    a pressure indicating member having a lower portion which includes a lower surface that abuts against said raised portion so as to be moved with said raised portion along the central axis, and an upper surface opposite to said lower surface along the central axis and confronting said cap;
    an adjustable member mounted in said mounting hole, and movable adjustably relative to said cap along the central axis; and
    a biasing member disposed between said upper surface of said lower portion of said pressure indicating member and said adjustable member to bias said pressure indicating member towards said air ventilating member against movement of said raised portion.

2. The tire pressure gauge of claim 1, wherein said biasing member is a compression spring, and has two ends abutting against said adjustable member and said upper surface of said lower portion of said pressure indicating member, respectively.

3. The tire pressure gauge of claim 1, wherein said cap includes
    a top wall having an outer periphery and an inner peripheral edge which surrounds the central axis,
    a barrel wall extending from said periphery of said top wall towards said inner wall so as to be secured to said surrounding wall, thereby enabling said cap to cover and close said receiving chamber, and
    a tubular wall extending from said inner peripheral edge towards said inner wall so as to define said mounting hole;
    said adjustable member engaging threadedly said tubular wall so as to be moved adjustably along the central axis against biasing action of said compression spring.

4. The tire pressure gauge of claim 3, wherein said barrel wall of said cap includes a see-through area so as to permit said receiving chamber to be visible from outside.

5. The tire pressure gauge of claim 4, wherein said pressure indicating member further has a sleeve wall extending from said lower portion towards said top wall such that when said lower surface of said lower portion of said pressure indicating member is moved with said raised portion, said sleeve wall is brought to surround said tubular wall, the extent of said tubular wall being surrounded by said sleeve wall as viewed through said see-through area indicating internal pressure of the tire, said sleeve wall having a selected color.

6. The tire pressure gauge of claim 5, wherein said adjustable member has first and second portions which are opposite to each other along the central axis, which are proximate to said top wall of said cap and said upper surface of said lower portion of said pressure indicating member, respectively, and which have different colors.

7. The tire pressure gauge of claim 5, further comprising an indicating sleeve which is sleeved on said tubular wall, and which has first and second portions that are opposite to each other along the central axis, that are proximate to said top wall of said cap and said upper surface of said lower portion of said pressure indicating member, respectively, and that respectively display different colors.

8. The tire pressure gauge of claim 3, further comprising a pressure indicating label attached to said top wall of said cap so as to show a range of tire pressure being adopted.

9. The tire pressure gauge of claim 1, wherein said flexible diaphragm is made of an elastomeric material, and further has a surrounding base portion surrounding said raised portion, said barrel wall of said cap having a lower surrounding edge which cooperates with said air ventilating member to define an annular retaining groove therebetween for retaining said surrounding base portion in said annular retaining groove.

* * * * *